United States Patent [19]
Grachtrup

[11] Patent Number: 4,457,520
[45] Date of Patent: Jul. 3, 1984

[54] DEVICE FOR SEALING THE GAP BETWEEN A ROTARY KILN AND AN INLET HOUSING

[75] Inventor: Heinz Grachtrup, Ennigerloh, Fed. Rep. of Germany

[73] Assignee: Krupp Polysius AG, Beckum, Fed. Rep. of Germany

[21] Appl. No.: 361,425

[22] Filed: Mar. 24, 1982

[30] Foreign Application Priority Data

Apr. 10, 1981 [DE] Fed. Rep. of Germany ....... 3114695

[51] Int. Cl.³ .......................... F16J 15/38; F27B 7/24
[52] U.S. Cl. ....................................... 277/85; 277/12; 277/198; 432/115; 432/242
[58] Field of Search ................. 277/81 R, 58, 85, 120, 277/198, 32, DIG. 4; 432/3, 103, 64, 115, 242; 34/242

[56] References Cited

U.S. PATENT DOCUMENTS

| | | | |
|---|---|---|---|
| 1,620,989 | 3/1927 | Agthe | 432/115 |
| 2,253,098 | 8/1941 | Schneider | 432/115 X |
| 3,837,658 | 9/1974 | Skinner et al. | 277/85 X |
| 3,940,239 | 2/1976 | Rossi et al. | 34/242 X |
| 3,980,128 | 9/1976 | Stockman | 277/85 X |
| 4,193,756 | 3/1980 | Leon | 432/115 X |

FOREIGN PATENT DOCUMENTS

| | | | |
|---|---|---|---|
| 1280475 | 10/1968 | Fed. Rep. of Germany | 432/115 |
| 277202 | 11/1970 | U.S.S.R. | 432/115 |

OTHER PUBLICATIONS

Translation of Russian Patent No. 277,202, 3 pp.
Translation of German Patent No. 1,280,475, 8 pp.

*Primary Examiner*—Robert S. Ward, Jr.
*Attorney, Agent, or Firm*—Learman & McCulloch

[57] ABSTRACT

A device for sealing the gap between the inlet end of a rotary kiln and a stationary inlet housing. In this device a ring which is capable of sliding in the axial direction is supported on a stationary ring by at least one first annular sealing element, and the sliding ring has on its end facing the rotary kiln a first wearing surface which co-operates with a second wearing surface on a rotating ring fixed on the inlet end of the rotary kiln. Cylinders operated by a pressure medium urge the sliding ring in a direction towards the inlet end of the rotary kiln and hold the two wearing surfaces in close sealing contact with one another. To ensure that the sealing contact of the wearing surfaces can be maintained even with relatively long rotary kilns in all states (cold and hot), the sliding ring includes a plurality of ring elements which are concentric and telescopic. The inner ring element is supported by the first sealing element on the stationary ring while the outer ring element bearing the first wearing surface is supported by a second sealing element on the inner ring element.

10 Claims, 2 Drawing Figures

DEVICE FOR SEALING THE GAP BETWEEN A ROTARY KILN AND AN INLET HOUSING

BACKGROUND OF THE INVENTION

The invention relates to a device for sealing the gap between the inlet end of a rotary kiln and a stationary inlet housing.

In view of the great lengths of modern rotary kilns and taking account of the considerable differences in temperature between the operating state and the cold state of such a furnace installation, considerable changes in position of the inlet end of the rotary kiln, caused by thermal expansion, occur on transition from the operating state to the cold state and vice versa. The exhaust gases extracted at the inlet end of the rotary kiln are usually used in a heat exchanger arranged in front of the rotary kiln for preheating the raw material, and therefore satisfactory sealing of the gap between the inlet end of the rotary kiln and the stationary inlet housing must be ensured in order to prevent the infiltration of air there. Such sealing must be ensured not only after the normal warm operating state has been reached, but also on starting up of the furnace which is still essentially cold.

It has been shown in practice that this requirement is not fulfilled satisfactorily by the known arrangements. In the known arrangements the sliding ring is to some extent axially movable and is pushed in the direction towards the inlet end of the rotary kiln by a cylinder which is operated by a pressure medium. However, if the variation in position of the rotary kiln is particularly great (resulting from a great furnace length), the clearance of motion of the sliding ring in the known arrangements is not sufficient to keep the two wearing surfaces (one of which is borne by the sliding ring and the other by the ring which rotates with the rotary kiln) in sufficiently close contact to form a seal even when the furnace installation is in the cold state, and thus at the particularly critical time of restarting the furnace.

An increase in the length of the stationary ring, and with it a corresponding increase in the movability of the sliding ring, is, on the other hand, very difficult to achieve from the design point of view, since this would have a very unfavourable effect on the construction of the inlet chute which delivers the material to the rotary kiln (by reducing the angle of inclination of this chute).

The object of the invention, therefore, is to avoid these disadvantages of the known constructions and to provide a device of the type described above which is distinguished by a particularly large range of movement of the sliding ring and which ensures satisfactory sealing of the gap between the inlet end of the rotary kiln and the stationary inlet housing even in the case of very long rotary kilns in the cold state.

SUMMARY OF THE INVENTION

According to the invention the sliding ring consists of a plurality, preferably two, sliding ring elements which are arranged so that they are concentric with one another and telescopic relative to one another, the inner ring element being supported by the first sealing element on the stationary ring, whilst the outer ring element bearing the first wearing surface is supported by a second ring-shaped sealing element on the inner ring element.

The range of movement of the sliding ring is substantially increased by the invention without increasing the length of the stationary ring and thus without restriction of the optimum construction of the inlet chute. In this way the two wearing surfaces remain in close sealing contact with each other in all circumstances, particularly even with very long rotary kilns in the cold state.

THE PREFERRED EMBODIMENT

Figure 1:
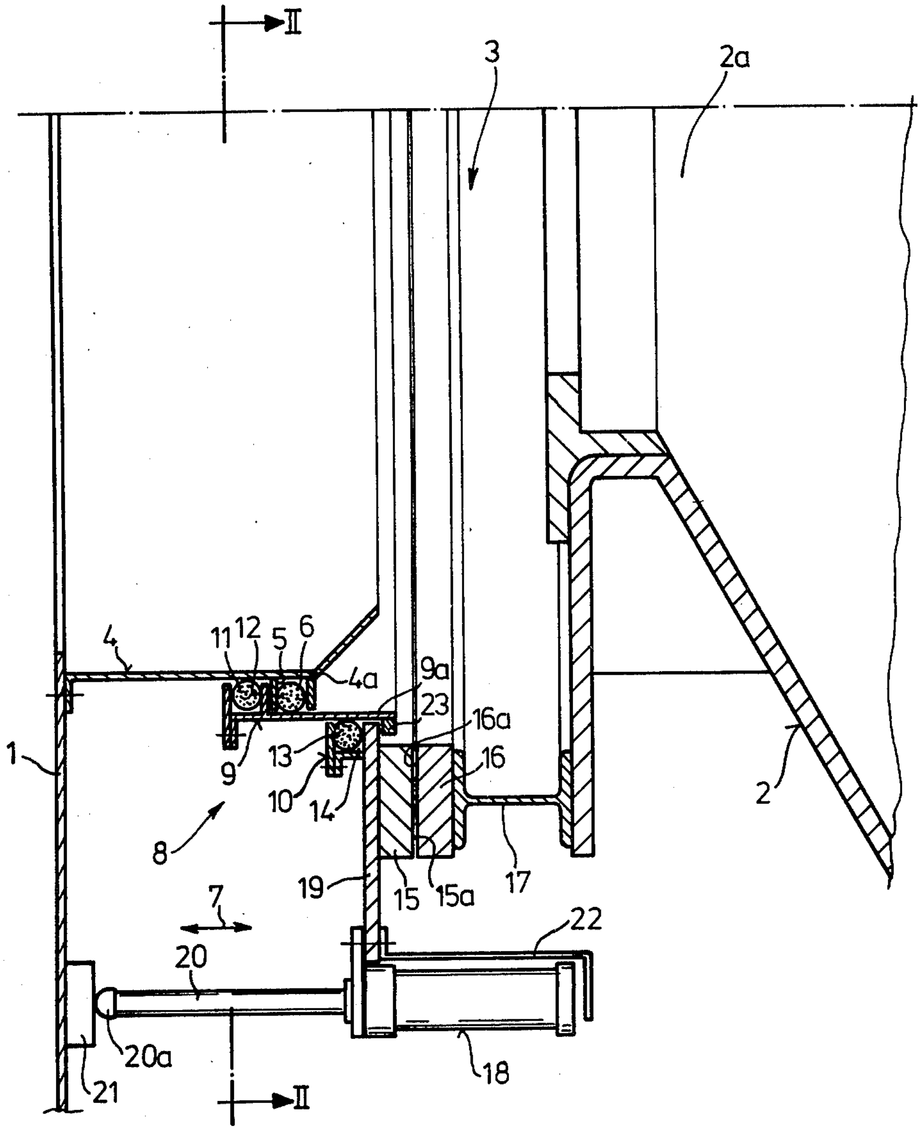
FIG. 1 is a partial longitudinal section through the gap sealing device at one end of a rotary furnace and taken approximately along the line I—I of FIG. 2.

The gap sealing device shown in the drawings is provided in the transition region of a stationary inlet housing, only the outer wall 1 of which can be seen in FIG. 1, and the inlet end **2*a* of a rotary kiln 2 which is merely indicated, in order to seal the gap 3** which occurs there from the exterior.

A stationary ring 4 which extends from the wall 1 in the axial direction toward the inlet end **2*a* of the rotary kiln and is of substantially cylindrical construction is fixed on the inlet housing or the outer wall 1 thereof. An annular channel 5 which is open towards the exterior is formed on the outer peripheral surface of the free end 4*a* of this ring 4 facing the rotary kiln 2, and an annular sealing element 6** (e.g., asbestos cord or the like) which extends over the whole periphery of the ring is arranged in the annular channel.

A sliding ring 8 which is fixed against rotation but movable in the axial direction (double arrow 7) is arranged on the outside of the stationary ring 4. This sliding ring 8 can be assembled from a plurality of ring elements which are arranged concentric to one another and can slide telescopically relative to one another in the axial direction; in the illustrated embodiment this sliding ring 8 consists of an inner ring element 9 and an outer ring element 10 (i.e., preferably two such ring elements).

The inner ring element 9 is supported by a first annular sealing element 11 on the stationary ring 4, this first sealing element 11 being arranged in an annular channel 12 which is open towards the interior and runs around the inner peripheral surface of the end of this ring element 9.

On the outer peripheral surface of the inner ring element 9 the outer ring element 10 is supported by a second annular sealing element 13. This second sealing element 13 is also contained in an annular channel 14 which runs around the periphery of the outer ring element 10 and is open towards the inner ring element 9.

On the surface of the outer ring element 10 of the sliding ring 8 facing the rotary kiln 2 there is a first wearing surface **15*a* formed by wear ring 15 which is firmly connected to the outer ring element 10 (e.g., by screws or rivets). A second wear ring 16 is fixed against rotation on a ring 17, which in turn is mounted so as to be fixed against rotation on the inlet end 2*a* of the rotary kiln 2. The ring 16 has a second wearing surface 16*a* which contacts the first wearing surface 15*a* and forms a seal. The wear rings 15 and 16** are made in the usual manner from a suitable material, e.g., ST 37 steel, and are either made in one continuous piece or, as is generally preferred, produced from ring segments.

A plurality of cylinders 18 operated by a pressure medium (e.g., pneumatic cylinders) act between the inlet housing wall 1 and the sliding ring 8 and are evenly distributed over the periphery of the sealing device. These cylinders press the sliding ring 8 in the direction towards the inlet end 2a of the rotary kiln 2 and hold the wearing surfaces 15a and 16a in close sealing contact with each other.

In the illustrated embodiment the cylinders 18 are supported by the outer ring element 10, and this outer ring element 10 has an annulus 19 the external diameter of which is considerably greater than that of the other parts, and the cylinders 18 are then fixed (preferably screwed) onto the external periphery of the annulus 19 in such a way that the free ends 20a of their piston rods 20 bear on the outer inlet housing wall 1 or abutments 21 provided there (correspondingly arranged in the peripheral direction).

Interposed between the cylinders 18 and the rotary kiln 2 are heat shields 22.

In the illustrated embodiment the annular channel 5 on the stationary ring 4 and the annular channel 12 on the inside of the inner ring element 9 co-operate with one another to form two stops which limit the maximum axial movement of the inner ring element 9 on the stationary ring 4 towards the right. A stop arrangement 23 is mounted on the outer peripheral surface of the end 9a of the inner ring element 9 facing the rotary kiln 2 and this limits the maximum movement of the ring element 10 to the right by co-operating with the stop arrangement 23 via its annular channel 14. This stop arrangement 23 can either be formed by a ring which goes all the way round or by a number of relatively short ring sections.

In the manner described above the co-operation of the inner ring element 9 with the outer ring element 10 on the one hand and the co-operation of the inner ring element 9 with the stationary ring 4 on the other hand results in a multiple telescopic movability of the said parts relative to each other and in the intermediate regions between the said parts the annular sealing elements 6, 11, 13 provide a reliable seal. However, it should be mentioned at this point that in a somewhat simpler embodiment the annular sealing element 6 in the annular channel 5 of the stationary ring 4 could be omitted and then instead of the annular channel 5 a stop arrangement corresponding substantially to the stop arrangement 23 could be provided with which the the annular channel 12 would co-operate. In any case a relatively great outward movement of the sealing device is made possible, whilst the gap 3 between the stationary inlet housing and the rotating inlet end of the rotary kiln 2a is reliably sealed by the wearing surfaces 15a and 16a.

Figure 2:
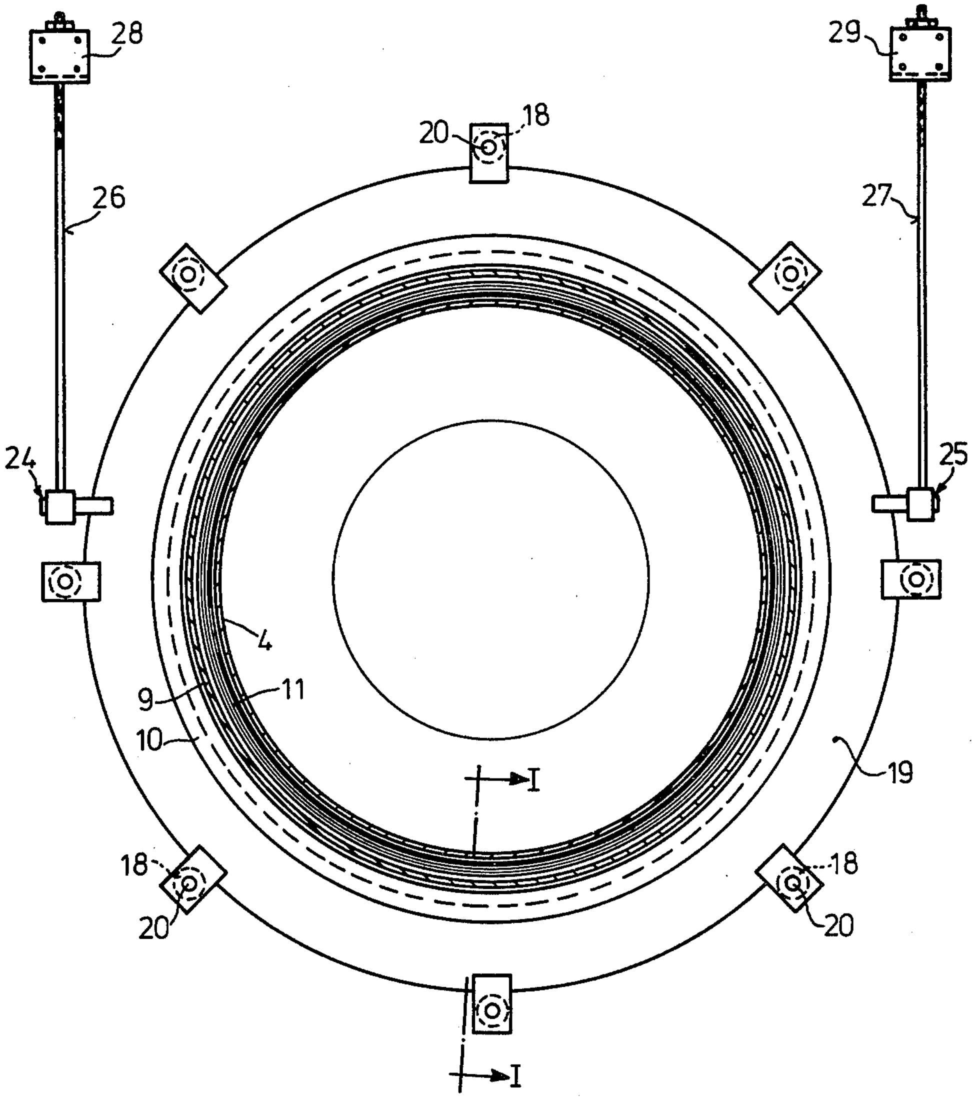
FIG. 2 is a cross-sectional view along the line II—II of FIG. 1.

The mounting of the sliding ring 8 is of importance. For this purpose the outer ring element 10 has on its outer periphery two retaining joints 24, 25 which hold this ring element 10 on the stationary inlet housing wall 1 by means of suspension arrangements 26,27 respectively so that the said ring element can slide axially but cannot rotate. These retaining joints are conveniently mounted in two peripheral regions which lie approximately opposite to one another on the annulus 19 (as shown in FIG. 2). The suspension arrangements for the outer ring element 10 are essentially formed by suspension rods 26, 27 the effective supporting length of which can be adjusted, particularly by means of screws, and which are provided with mounting plates 28,29 which can be screwed to corresponding points on the outer inlet housing wall 1 or fixed in another way.

What is claimed is:

1. In a device for sealing the gap between the inlet end of a rotary kiln and a stationary inlet housing having a stationary feed tube, a first wear ring carried by said kiln for rotation therewith, a second wear ring confronting said first wear ring for sealing engagement therewith, means mounting said second wear ring on said feed tube for axial movement relative to said first wear ring, and yieldable means urging said second wear ring into engagement with said first wear ring, the improvement wherein said mounting means comprises at least two concentric, telescopic ring elements the inner one of which encircles said feed tube and the outer one of which is fixed to said second wear ring, each of said ring elements being movable axially relative to said feed tube.

2. A device according to claim 1 including a sealing element interposed between the inner one of said ring elements and said feed tube.

3. A device according to claim 1 including a sealing element interposed between said inner and outer ring elements.

4. A device according to claim 1 including engageable stops carried by said ring elements for limiting relative telescopic movement thereof.

5. A device according to claim 4 wherein said stops comprise channels in which sealing elements are accommodated.

6. A device according to claim 4 wherein one of said stops is mounted on the outer peripheral surface of the inner ring element.

7. A device according to claim 1 including retaining joints connecting said outer ring element to the stationary inlet housing to prevent rotation of said outer ring element.

8. A device according to claim 7 wherein said retaining joints include adjustable length suspension means for suspending said outer ring element from said housing.

9. A device according to claim 7 wherein said retaining joints are mounted on an annulus fixed to said outer ring element and having a diameter greater than that of said outer ring element.

10. A device according to claim 9 wherein said yieldable means are carried by said annulus.

* * * * *